United States Patent Office 3,012,360
Patented Dec. 12, 1961

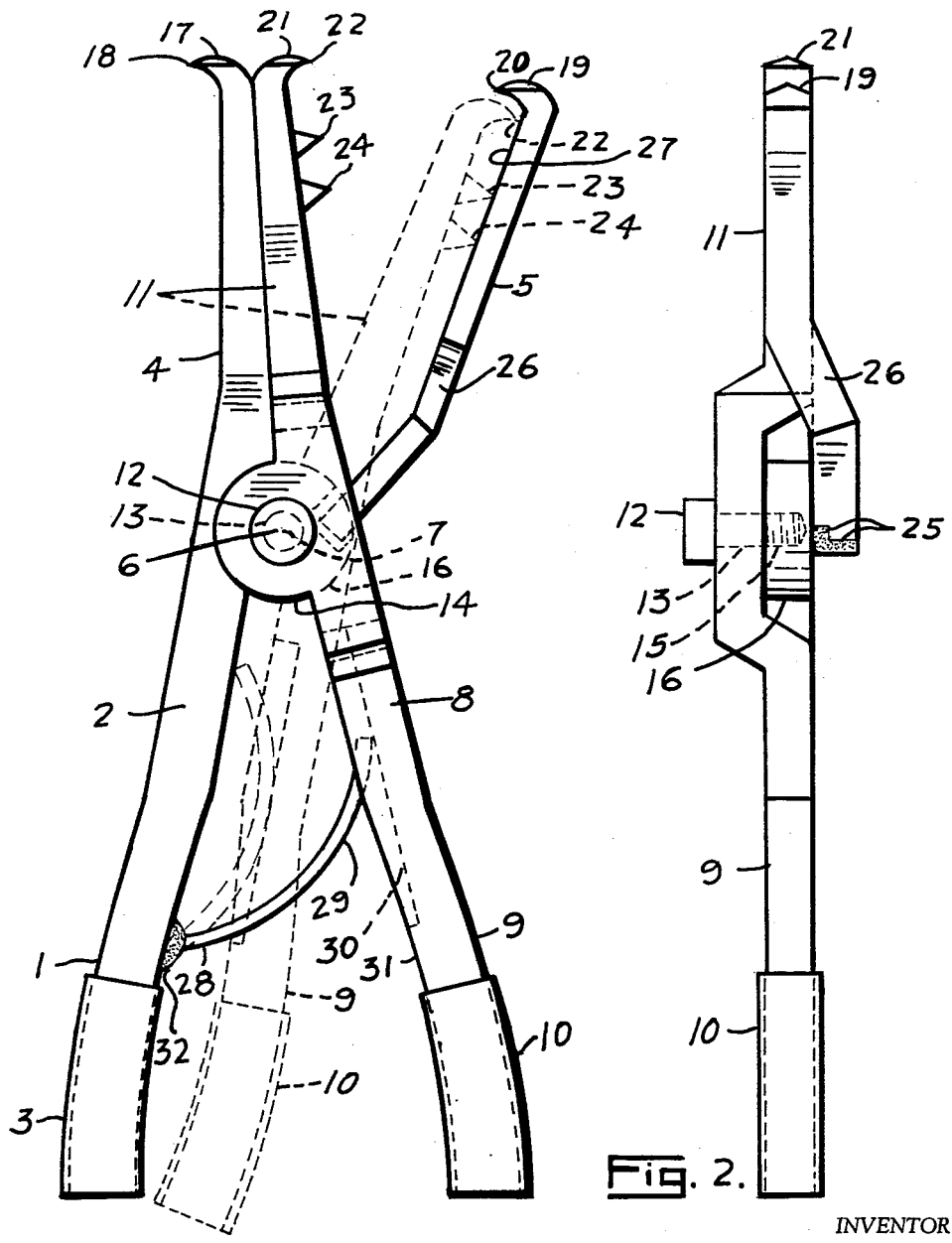

3,012,360
FISH CLAMP AND MOUTH SPREADER
Johnnie E. Creel, Prein Lake Road, Rte. 3, Box 218, Lake Charles, La., and Walter G. Holsomback, 215 Canal St., Sulphur, La.
Filed Jan. 14, 1960, Ser. No. 2,414
2 Claims. (Cl. 43—53.5)

This invention relates to new and useful improvements in a fish clamp and mouth spreader used for inserting partly in mouth of a fish or the like for spreading open the mouth and for clamping the mouth to securely hold the fish to facilitate the removal of a fish hook and stringing of a fish to prevent escape and finning the person performing these operations with the device.

An object of the invention is to provide a device of the character described having two sections joined to each other in pivotal relation one section terminating in divided prongs and the other section terminating with a single prong intermediate of the divided prongs of the other section and movable in opposite direction from one of said prongs from inoperative position toward the other prongs to operative position for spreading and opening the mouth of a fish into which said prongs are inserted and clamping the mouth of a fish when the intermediate prong is moved adjacent to the other co-operating prong remaining outside of the mouth of the fish, and, said intermediate prong is adapted to be moved and returned to the first named prong inside the mouth of the fish to inoperative position for releasing the clamp and for easy removal from the mouth of the fish.

These and other objects of the invention will in part be obvious and will in part be more fully disclosed in the specifications, the drawings of which show by way of illustration one embodiment of the invention, in which:

FIG. 1 is a vertical side view in elevation of the device; and,

FIG. 2 is a vertical edge view in elevation of the device.

Referring to the accompanying drawings in which like numerals herein denote like numeraled parts therein in the various views. The present inventions will be better understood from a detailed description thereof, in which, the numeral 1 denotes the handle of plier section 2 the lower end of which is provided with sleeve 3 of any suitable material for hand grip and the upper end of said plier section 2 terminating in two outwardly diverging prongs 4 and 5 extending from enlarged boss 16 the center of which is common pivotal point 6 of said plier section 2 with respect to the common pivotal point 7 of plier section 8 at the center of enlarged boss 14 thereof. The plier section 8 is provided with handle 9 the lower end of which has sleeve 10 of any suitable material to form a hand grip and the upper end of plier section 8 terminates in a single prong 11 extending from enlarged boss 14 thereof and positioned intermediate of said outwardly diverging prongs 4 and 5 of plier section 2. A stud bolt 12 or the like is inserted through hole 13 in enlarged boss 14 of plier section 8 which is concentric with the common pivotal points 7 thereof, which stud bolt 12 threadedly screws into internal threaded hole 15 in enlarged boss 16 of plier section 2 which is concentric with the common pivotal point 6 thereof.

Prong 4 of plier section 2 terminates in thin bevelled edge 17 which has an outward sharpened point on tooth 18 and the opposed prong 5 of plier section 2 terminates in thin bevelled edge 19 which has an inward sharpened point on tooth 20. The single prong 11 of plier section 8 terminates in thin bevelled edge 21 which has an inward sharpened point on tooth 22 facing toward the inward sharpened point on tooth 20 of prong 5, and facing as well toward inward sharpened points on teeth 23 and 24 below the inward sharpened point on tooth 22. The prong 5 is welded by weld 25 to boss 16 of plier section 2 and said prong 5 has an offset portion 26 so that from said offset portion 26 to the bevelled end 19 thereof said prong 5 and its sharpened point on tooth 20 will face opposite to prong 11 and the sharpened points on teeth 22, 23 and 24 thereof during their respective movements in the operation of the device as is indicated in FIG. 1 of the drawings which show prongs 5 and 11 in inoperative positions while the dotted lines show the full operative position of prong 11 with respect to prong 5 in the same view when the handle 9 is depressed toward handle 1 in full operative position so that sharpened points on teeth 22, 23 and 24 of prong 11 and sharpened point on tooth 18 of prong 4 having fully spread the mouth of a fish into which prongs 4 and 11 have been inserted at which time the said sharpened points on teeth 22, 23 and 24 engage the inner face 27 of prong 5 in co-operation with sharpened point on tooth 20 of prong 5 to clamp one side of the mouth to hold and secure the fish after the spreading operation. When the handles 9 and 1 are depressed inwardly toward each other the outer curved surface 29 of the curved spring arm 28 traverses the groove 30 indented in the inner face 31 of handle 9. One end of said curved spring arm 28 is welded at weld 32 to the inside of handle 1 at an angle so that the outer curved surface 29 of said curved spring arm 28 bears against the bottom of said groove 30 with sufficient tension to normally hold said handles 9 and 1 apart to inoperative position and when said handles are gripped to depress same more tension is placed on said spring arm 28 as the outer surface 29 thereof traverse the groove 30 and upon releasing the hand grip of the handles 9 and 1 the said spring arm 28 will cause the handles 9 and 1 to be urged outwardly away from each other to inoperative position by reason of the force exerted by the tension on said spring arm 28.

Preferably in the operation of the device the thin bevelled edges 17 and 21 are inserted horizontally edgewise into the mouth of the fish between the upper and lower jaws and then the device is oriented by hand substantially 90 degrees so that upon depressing the handles 1 and 9 toward each other the sharpened points of teeth 18 and 22 will pierce and spread apart the upper and lower jaws of the fish and when in operative position teeth 22, 23 and 24 of prong 11 in co-operation with tooth 20 of prong 5 will clamp one jaw of the mouth therebetween to secure and hold the fish with mouth spread in opened position for easy removal of hook and stringing fish or other contingency.

It is obvious that many changes may be made in the details of construction and arrangement of the parts of the device without departing from the spirit and scope of the invention.

Having thus described the invention, what we claim as new and desire to secure by Letters Patent, is:

1. A device for spreading open the jaws of the mouth of a fish and for clamping the mouth from the inside and outside including two plier sections pivotally connected to each other, one plier section having a handle on one end and the other end thereof terminating in two outwardly diverging prongs one having a tooth with a piercing point facing inwardly from its prong and one having a tooth with a piercing point facing outwardly from its prong, said other plier section having a handle on one end and the other end thereof terminating in one intermediate prong positioned intermediate of said two outwardly diverging prongs of said first named plier section with a tooth with a piercing point thereon facing and movable toward a jaw inside the mouth of a fish and toward one of said piercing points of said diverging prongs to operative position for spreading open the mouth of a fish with opposed piercing points on said prongs above named to be inserted in the mouth of a fish and for clamping one jaw of the mouth of a fish with piercing points positioned to face each other on said intermediate prong and on one of said prongs of the other plier section.

2. A device for spreading open the jaws of the mouth of a fish and for clamping the mouth from the inside and outside including two plier sections pivotally connected to each other, one plier section having a handle on one end and the other end thereof terminating in two outwardly diverging prongs one having a tooth with a piercing point facing inwardly from its prong and one having a tooth with a piercing point facing outwardly from its prong, said other plier section having a handle on one end and the other end thereof terminating in one intermediate prong positioned intermediate of said two outwardly diverging prongs of said first named plier section with a tooth with a piercing point thereon facing and movable toward a jaw inside the mouth of a fish and toward one of said piercing points of said diverging prongs to operative position for spreading open the mouth of a fish with opposed piercing points on said prongs above named to be inserted in the mouth of a fish and for clamping one jaw of the mouth of a fish with piercing points positioned to face each other on said intermediate prong and on one of said prongs of the other plier section, said intermediate prong movable back to the other of said diverging prongs to inoperative position to release the mouth of a fish into which said intermediate prong and one of said diverging prongs has been inserted.

References Cited in the file of this patent

UNITED STATES PATENTS

| | | |
|---|---|---|
| 2,867,937 | Little | Jan. 13, 1959 |
| 2,891,275 | Schuls | June 23, 1959 |